(12) United States Patent
Desjardins et al.

(10) Patent No.: US 12,416,264 B2
(45) Date of Patent: Sep. 16, 2025

(54) LUBRICATION SYSTEM FOR AIRCRAFT POWERPLANT AND CLUTCH SYSTEM

(71) Applicant: Pratt & Whitney Canada Corp., Longueuil (CA)

(72) Inventors: Michel Desjardins, Saint-Hubert (CA); Eric S. Durocher, Boucherville (CA); Guillaume Landry-Drolet, Boucherville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/381,066

(22) Filed: Oct. 17, 2023

(65) Prior Publication Data

US 2025/0122841 A1    Apr. 17, 2025

(51) Int. Cl.
| | | |
|---|---|---|
| *F02C 7/36* | (2006.01) | |
| *B64D 35/08* | (2025.01) | |
| *F02C 7/06* | (2006.01) | |
| *F02C 7/14* | (2006.01) | |

(52) U.S. Cl.
CPC ............ *F02C 7/36* (2013.01); *F02C 7/06* (2013.01); *F05D 2260/4023* (2013.01); *F05D 2260/98* (2013.01)

(58) Field of Classification Search
CPC ..... B64C 29/0033; B64C 27/12; B64C 27/14; B64C 27/28; B64C 27/52; B64C 27/06; B64C 27/00; F01D 25/20; F01D 15/08; F01D 25/183; F01D 15/10; F01D 25/18; F01D 5/02; F01D 9/065; F01D 25/36; F02C 7/06; F02C 7/32; F02C 7/36; B64D 35/00; B64D 27/026; F05D 2260/98; F05D 2260/4023; F05D 2220/32; F05D 2240/60; F04D 29/063
See application file for complete search history.

(56) References Cited

U.S. PATENT DOCUMENTS

| | | |
|---|---|---|
| 3,608,910 A | 9/1971 | Tyler |
| 4,493,623 A | 1/1985 | Nelson |
| 4,829,850 A | 5/1989 | Soloy |
| 5,192,084 A | 3/1993 | Norbury |

(Continued)

FOREIGN PATENT DOCUMENTS

| | | |
|---|---|---|
| JP | 2016176536 A | 10/2016 |
| WO | 9427050 B1 | 11/1994 |

OTHER PUBLICATIONS

Rotorcraft Manufacturer's Data, Eagle Copters Ltd., Jan. 5, 2015, https://www.eaglecopters.com/wp-content/uploads/2022/11/56.-MD-E407-789-1-Rev-1.pdf.

(Continued)

*Primary Examiner* — Eric J Zamora Alvarez
(74) *Attorney, Agent, or Firm* — Getz Balich LLC

(57) ABSTRACT

A system is provided for an aircraft. This aircraft system includes a powertrain and a first lubrication system. The powertrain includes a powerplant, a bladed rotor and a clutch system operatively coupling the powerplant to the bladed rotor. The powerplant is configured to drive rotation of the bladed rotor through the clutch system when the clutch system is engaged. The first lubrication system is fluidly coupled with and is configured to deliver first lubricant to the powerplant and the clutch system.

18 Claims, 3 Drawing Sheets

(56) References Cited

U.S. PATENT DOCUMENTS

| | | | |
|---|---|---|---|
| 8,313,281 B2 | 11/2012 | Rickert | |
| 9,708,074 B2 | 7/2017 | Jaenker | |
| 9,964,039 B2* | 5/2018 | Parnin | F02C 7/06 |
| 9,964,184 B2 | 5/2018 | Modrzejewski | |
| 10,125,628 B2* | 11/2018 | Nguyen | H02J 3/1885 |
| 10,329,955 B2* | 6/2019 | Menheere | F02C 7/36 |
| 10,468,944 B2 | 11/2019 | Sethi | |
| 10,557,359 B2 | 2/2020 | Amador | |
| 10,946,954 B2 | 3/2021 | Ehinger | |
| 11,104,430 B2 | 8/2021 | Fenny | |
| 11,280,398 B2* | 3/2022 | Parsons | F16H 57/0445 |
| 11,313,455 B2 | 4/2022 | Mueller | |
| 2016/0207618 A1 | 7/2016 | Darrow, Jr. | |
| 2017/0227067 A1 | 8/2017 | Bouton | |
| 2017/0284535 A1* | 10/2017 | Ehinger | B64C 27/14 |
| 2020/0003295 A1 | 1/2020 | Parsons | |
| 2020/0191276 A1 | 6/2020 | Kopp | |
| 2021/0403168 A1* | 12/2021 | Parsons | B64D 27/02 |
| 2022/0397060 A1* | 12/2022 | Winter | F02C 7/06 |
| 2023/0062203 A1 | 3/2023 | Wüstenberg | |

OTHER PUBLICATIONS

EP Search Report for EP Patent Application No. 24207051.4 dated Mar. 3, 2025.

* cited by examiner

LUBRICATION SYSTEM FOR AIRCRAFT POWERPLANT AND CLUTCH SYSTEM

TECHNICAL FIELD

This disclosure relates generally to an aircraft and, more particularly, to lubricating powertrain components of the aircraft.

BACKGROUND INFORMATION

Various systems and methods are known in the art for delivering lubricant to components of an aircraft. While these known lubricant delivery systems and methods have various benefits, there is still room in the art for improvement.

SUMMARY

According to an aspect of the present disclosure, a system is provided for an aircraft. This aircraft system includes a powertrain and a first lubrication system. The powertrain includes a powerplant, a bladed rotor and a clutch system operatively coupling the powerplant to the bladed rotor. The powerplant is configured to drive rotation of the bladed rotor through the clutch system when the clutch system is engaged. The first lubrication system is fluidly coupled with and is configured to deliver first lubricant to the powerplant and the clutch system.

According to another aspect of the present disclosure, another system is provided for an aircraft. This aircraft system includes a powertrain and a lubrication system. The powertrain includes a powerplant, a bladed rotor and a clutch system operatively coupling the powerplant to the bladed rotor. The powerplant is configured to drive rotation of the bladed rotor through the clutch system when the clutch system is engaged. The lubrication system includes a heat exchanger and a lubricant circuit. The heat exchanger includes an inlet and an outlet. The lubricant circuit extends longitudinally from the outlet to the inlet and through the powerplant and the clutch system.

According to still another aspect of the present disclosure, another system is provided for an aircraft. This aircraft system includes a powertrain, a first lubrication system and a second lubrication system. The powertrain includes a powerplant, a bladed rotor, a geartrain and a clutch system. The powerplant is configured to drive rotation of the bladed rotor through the clutch system and the geartrain. The geartrain operatively couples the bladed rotor to the clutch system. The clutch system operatively couples the geartrain to the powerplant when the clutch system is engaged. The first lubrication system is configured to deliver a first lubricant to the powerplant and the clutch system. The second lubrication system is configured to deliver a second lubricant to the geartrain. The second lubrication system is fluidly independent of the first lubrication system.

The powertrain may also include a second geartrain operatively coupling the powerplant to the clutch system. The first lubrication system may also be configured to deliver the first lubricant to the second geartrain.

The powertrain may also include a power transmission operatively coupling the powerplant to the clutch system. The lubricant circuit may also extend through the power transmission.

The lubricant circuit may extend sequentially from the power transmission, through the powerplant, to the clutch system.

The powerplant may also include a power transmission operatively coupling the powerplant to the clutch system. The first lubrication system may be fluidly coupled to and may also be configured to deliver the first lubricant to the power transmission.

The power transmission may be configured as or otherwise include a geartrain operatively coupling the powerplant to the clutch system. The first lubrication system may be fluidly coupled to and may also be configured to deliver the first lubricant to the geartrain.

The power transmission may be configured as or otherwise include an accessory geartrain. The first lubrication system may be fluidly coupled to and may also be configured to deliver the first lubricant to the accessory geartrain.

The first lubrication system may also include a heat exchanger and a lubricant circuit. The heat exchanger may include an inlet and an outlet. The lubricant circuit may extend longitudinally through the power transmission, the powerplant and the clutch system from the outlet to the inlet.

The first lubrication system may include a lubricant circuit extending in a downstream direction from the power transmission to the powerplant.

The first lubrication system may include a lubricant circuit extending in a downstream direction from the powerplant to the power transmission.

The first lubrication system may include a lubricant circuit extending in a downstream direction from the power transmission to the clutch system.

The first lubrication system may include a lubricant circuit extending in a downstream direction from the powerplant to the clutch system.

The powerplant may be configured as or otherwise include an internal combustion engine.

The powerplant may be configured as or otherwise include an electric motor.

The system may also include a geartrain and a second lubrication system. The geartrain may operatively couple the clutch system to the bladed rotor. The second lubrication system is fluidly independent of the first lubrication system. The second lubrication system is fluidly coupled with and configured to deliver second lubricant to the geartrain.

The system may also include a geartrain operatively coupling the clutch system to the bladed rotor. The first lubrication system is fluidly independent of the geartrain.

The bladed rotor may be configured as or otherwise include a rotorcraft rotor. The aircraft may be configured as or otherwise include a rotorcraft.

The rotorcraft rotor may be configured as or otherwise include a main rotorcraft rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
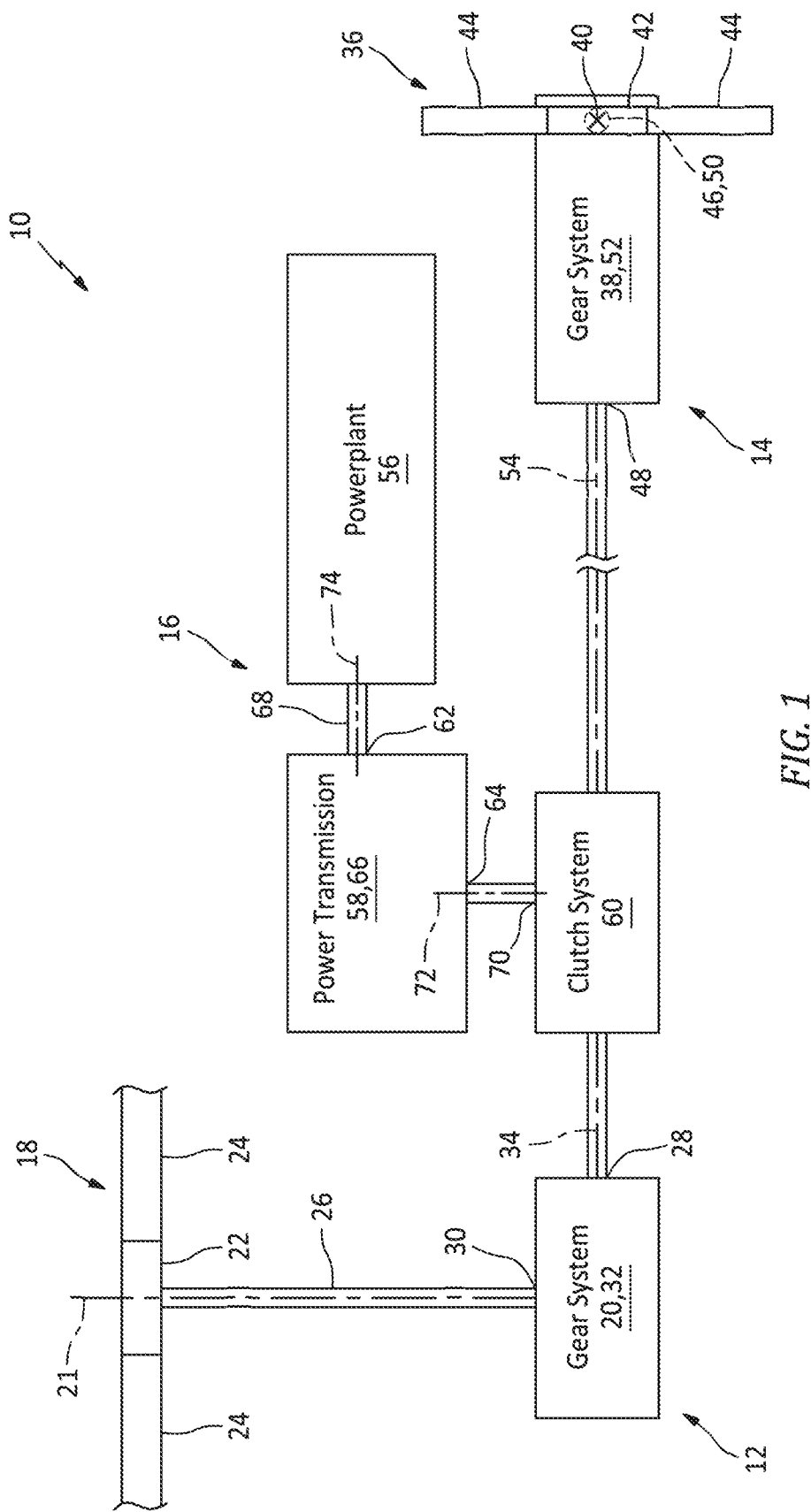
FIG. 1 is a partial schematic illustration of an aircraft powertrain.

FIG. 1 schematically illustrates a powertrain 10 for an aircraft such as a manned or unmanned rotorcraft; e.g., a helicopter, a drone, etc. The aircraft powertrain 10 includes one or more rotor systems 12 and 14 and a power system 16 for mechanically driving operation of the rotor systems 12 and 14.

The first rotor system 12 of FIG. 1 includes a first bladed rotor 18 (e.g., an air mover) and a first gear system 20. The first bladed rotor 18 may be configured as a main rotor for the aircraft (e.g., a rotorcraft main rotor), and the first gear system 20 may be configured as a main rotor gearbox of the aircraft powertrain 10.

The first bladed rotor 18 of FIG. 1 is configured to rotate about a first rotor axis 21 (e.g., a vertical axis) to generate aircraft lift and/or aircraft thrust. The first bladed rotor 18 includes a first rotor base 22 (e.g., a hub) and a plurality of first rotor blades 24 arranged circumferentially around, projecting radially out from and connected to the first rotor base 22.

The first gear system 20 is operatively coupled to the first bladed rotor 18 and its first rotor base 22 through at least one transmission device such as a first rotor shaft 26; e.g., a main rotor mast. The first gear system 20 of FIG. 1 includes an input 28, an output 30 and a geartrain 32; e.g., internal gearing. The first gear system input 28 is coupled to the power system 16. The first gear system output 30 is coupled to the first bladed rotor 18 through the first rotor shaft 26. The first gear system geartrain 32 couples the first gear system input 28 to the first gear system output 30. The first gear system geartrain 32 may be configured such that the first gear system input 28 is operable to rotate at a different (e.g., faster or slower) rotational speed than the first gear system output 30. The first gear system 20 may thereby be configured as a speed change device between the power system 16 and the first bladed rotor 18. The first gear system geartrain 32 may also (or alternatively) be configured to change a direction of power transmission through the first gear system 20. For example, the first gear system output 30 may rotate with the first bladed rotor 18 about the first rotor axis 21, and the first gear system input 28 may rotate about another axis 34 which is angularly offset from (e.g., perpendicular to) the first rotor axis 21. The present disclosure, however, is not limited to such an exemplary first gear system arrangement. The first gear system 20 and its first gear system geartrain 32, for example, may alternatively be configured such that the first gear system input 28 and the first gear system output 30 rotate at a common (the same) rotational speed.

The second rotor system 14 of FIG. 1 includes a second bladed rotor 36 (e.g., an air mover) and a second gear system 38. The second bladed rotor 36 may be configured as a tail rotor for the aircraft (e.g., a rotorcraft tail rotor), and the second gear system 38 may be configured as a tail rotor gearbox of the aircraft powertrain 10.

The second bladed rotor 36 of FIG. 1 is configured to rotate about a second rotor axis 40 (e.g., a horizontal axis) to generate lateral thrust to counteract a torque effect associated with rotation of the first bladed rotor 18. The second bladed rotor 36 includes a second rotor base 42 (e.g., a hub) and a plurality of second rotor blades 44 arranged circumferentially around, projecting radially out from and connected to the second rotor base 42.

The second gear system 38 is operatively coupled to the second bladed rotor 36 and its second rotor base 42 through at least one transmission device such as a second rotor shaft 46; e.g., a tail rotor shaft. The second gear system 38 of FIG. 1 includes an input 48, an output 50 and a geartrain 52; e.g., internal gearing. The second gear system input 48 is coupled to the power system 16. The second gear system output 50 is coupled to the second bladed rotor 36 through the second rotor shaft 46. The second gear system geartrain 52 couples the second gear system input 48 to the second gear system output 50. The second gear system geartrain 52 may be configured such that the second gear system input 48 is operable to rotate at a different (e.g., faster or slower) rotational speed than the second gear system output 50. The second gear system 38 may thereby be configured as a speed change device between the power system 16 and the second bladed rotor 36. The second gear system geartrain 52 may also (or alternatively) be configured to change a direction of power transmission through the second gear system 38. For example, the second gear system output 50 may rotate with the second bladed rotor 36 about the second rotor axis 40, and the second gear system input 48 may rotate about another axis 54 which is angularly offset from (e.g., perpendicular to) the second rotor axis 40. The present disclosure, however, is not limited to such an exemplary second gear system arrangement. The second gear system 38 and its second gear system geartrain 52, for example, may alternatively be configured such that the second gear system input 48 and the second gear system output 50 rotate at a common (the same) rotational speed. Moreover, in other embodiments, the second rotor shaft 46 may be omitted and the second bladed rotor 36 may be connected (e.g., directly) to the second gear system output 50.

The power system 16 of FIG. 1 includes an aircraft powerplant 56, a power transmission 58 and a clutch system 60. The aircraft powerplant 56 may be configured as or otherwise include a gas turbine engine (e.g., a turboshaft engine), a rotary engine (e.g., a Wenkel engine) or any other type of internal combustion engine capable of generating mechanical power for driving rotation of the bladed propulsor rotors 18 and 36. The aircraft powerplant 56 may alternatively be configured as or otherwise include a hybrid powerplant which includes internal combustion engine and one or more electric motors, or a full electric powerplant which includes one or more electric motors.

The power transmission 58 is configured to operatively couple the aircraft powerplant 56 to the clutch system 60. The power transmission 58 of FIG. 1, for example, includes an input 62, an output 64 and a geartrain 66; e.g., internal gearing such as an epicyclic gear system or another type of non-epicyclic gear system. The power transmission input 62 is coupled to an output 68 (e.g., an output shaft) from the aircraft powerplant 56. The power transmission output 64 is coupled to an input 70 into the clutch system 60. The power geartrain 66 couples the power transmission input 62 to the power transmission output 64. The power geartrain 66 may be configured such that the power transmission input 62 is operable to rotate at a different (e.g., faster or slower) rotational speed than the power transmission output 64. This power transmission 58 may thereby be configured as a speed change device between the aircraft powerplant 56 and the clutch system 60. The power geartrain 66 may also (or alternatively) be configured to change a direction of power transmission through the power transmission 58. For example, the power transmission output 64 may rotate about an output axis 72, and the power transmission input 62 may rotate about an input axis 74 which is angularly offset from (e.g., perpendicular to) the output axis 72. The present disclosure, however, is not limited to such an exemplary power transmission arrangement. The power transmission 58 and its power geartrain 66, for example, may alternatively be configured such that the power transmission input 62 and the power transmission output 64 rotate about a common (the same) axis or parallel axes.

The clutch system 60 is configured to selectively operatively couple the power transmission 58 to the first rotor system 12 and/or the second rotor system 14. The clutch system 60 of FIG. 1, for example, is configured to operatively couple the power transmission output 64 to the first gear system input 28 and/or the second gear system input 48 when a clutch or clutches within the clutch system 60 are engaged. The clutch system 60 of FIG. 1 is configured to decouple the power transmission output 64 from the first gear system input 28 and/or the second gear system input 48 when the clutch or the clutches within the clutch system 60 are disengaged. With this arrangement, the powerplant may be powered up without driving rotation of the first bladed rotor 18 and/or the second bladed rotor 36 when the clutch system 60 is disengaged and/or the first bladed rotor 18 and/or the second bladed rotor 36 may rotate independent of the powerplant when the clutch system 60 is disengaged.

Figure 2:
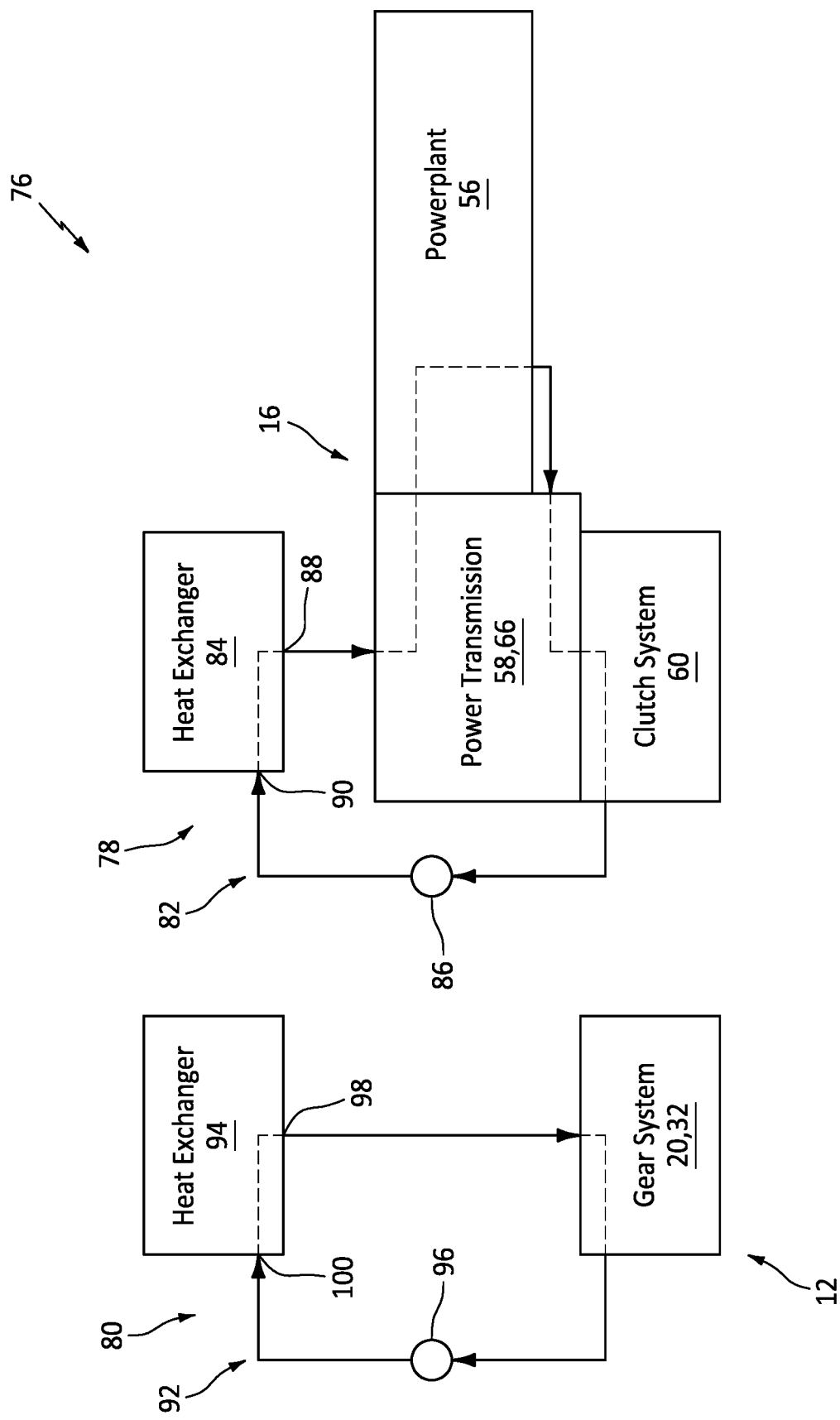
FIG. 2 is a partial schematic illustration of an aircraft system which includes the aircraft powertrain and one or more lubrication systems.

FIG. 2 schematically illustrates a system 76 of the aircraft which includes the aircraft powertrain 10 (see FIG. 1) and its members 20, 52, 56, 58 and 60 arranged with one or more lubrication systems 78 and 80. The power system lubrication system 78 is configured to service (e.g., lubricate, cool, etc.) at least (or only) the power system 16. The rotor system lubrication system 80 is configured to service (e.g., lubricate, cool, etc.) at least (or only) the first rotor system 12. These lubrication systems 78 and 80, however, are configured fluidly independent of one another. The power system lubrication system 78, for example, does not provide lubricant to nor receive lubricant from the rotor system lubrication system 80. Similarly, the rotor system lubrication system 80 does not provide lubricant to nor receive lubricant from the power system lubrication system 78. Each of the lubrication system 78, 80 may thereby circulate is own discrete lubricant, where the lubricants circulated within the lubrication system 78, 80 may be a common type of lubricant or different types of lubricant.

The power system lubrication system 78 is fluidly coupled with and configured to deliver its lubricant to the power system members 56, 58 and 60. The power system lubrication system 78 of FIG. 2, for example, includes a power system lubricant circuit 82, a power system lubricant heat exchanger 84 and a power system lubricant pump 86. This power system lubrication system 78, of course, may also include various other fluid system components, which are not shown in FIG. 2 for clarity of illustration. Examples of these other fluid system components include, but are not limited to, one or more filters, one or more sensors, one or more additional pumps, one or more additional heat exchangers, one or more lubricant collection devices (e.g., sumps, gutters, etc.), and the like.

The power system lubricant circuit 82 extends longitudinally (in a downstream direction) through the power system 16 from an outlet 88 from the power system lubricant heat exchanger 84 to an inlet 90 into the power system lubricant heat exchanger 84. More particularly, the power system lubricant circuit 82 of FIG. 2 extends longitudinally through an upstream region of the power transmission 58 (and its power geartrain 66), the aircraft powerplant 56, a downstream region of the power transmission 58 (and its power geartrain 66) and the clutch system 60 between the outlet 88 and the inlet 90 of the power system lubricant heat exchanger 84. Here, the upstream region of the power transmission 58 is upstream of the various power system members 56 and 60 along the power system lubricant circuit 82. The aircraft powerplant 56 is upstream of the various power system members 58 and 60 along the power system lubricant circuit 82. The downstream region of the power transmission 58 is upstream of the clutch system 60 along the power system lubricant circuit 82. The present disclosure, however, is not limited to such an exemplary trajectory through the various power system members 56, 58 and 60. For example, the aircraft powerplant 56 may alternatively be arranged (e.g., completely) upstream of the other power source members 58 and 60. In another example, the aircraft powerplant 56 may be arranged in parallel with the power transmission 58. The power system lubricant heat exchanger 84 is configured to cool the lubricant passing longitudinally therethrough from its inlet 90 to its outlet 88. The power system lubricant pump 86 is configured to circulate (e.g., pump) the lubricant within the power system lubrication system 78 and its power system lubricant circuit 82.

By servicing the power system components 56, 58 and 60 together with the power system lubricant circuit 82, seal interfaces between the power system components 56, 58 and 60 may be simplified since the same lubricant is directed those power system components 56, 58 and 60. Moreover, in contrast to providing a separate lubricant circuit for the clutch system 60, arranging the power system lubricant circuit 82 as described above may reduce an overall part count (e.g., tubes, screens, seals, etc.) for the aircraft system 76. This may in turn reduce aircraft system weight and/or cost.

The rotor system lubrication system 80 is fluidly coupled with and configured to deliver its lubricant to at least (or only) the first gear system 20. The rotor system lubrication system 80 of FIG. 2, for example, includes a rotor system lubricant circuit 92, a rotor system lubricant heat exchanger 94 and a rotor system lubricant pump 96. This rotor system lubrication system 80, of course, may also include various other fluid system components, which are not shown in FIG. 2 for clarity of illustration. Examples of these other fluid system components include, but are not limited to, one or more filters, one or more sensors, one or more additional pumps, one or more additional heat exchangers, one or more lubricant collection devices (e.g., sumps, gutters, etc.), and the like.

The rotor system lubricant circuit 92 extends longitudinally (in a downstream direction) through the first rotor system 12 and its first gear system geartrain 32 from an outlet 98 from the rotor system lubricant heat exchanger 94 to an inlet 100 into the rotor system lubricant heat exchanger 94. The rotor system lubricant heat exchanger 94 is configured to cool the lubricant passing longitudinally therethrough from its inlet 100 to its outlet 98. The rotor system lubricant pump 96 is configured to circulate (e.g., pump) the lubricant within the rotor system lubrication system 80 and its first gear system 20.

Figure 3:
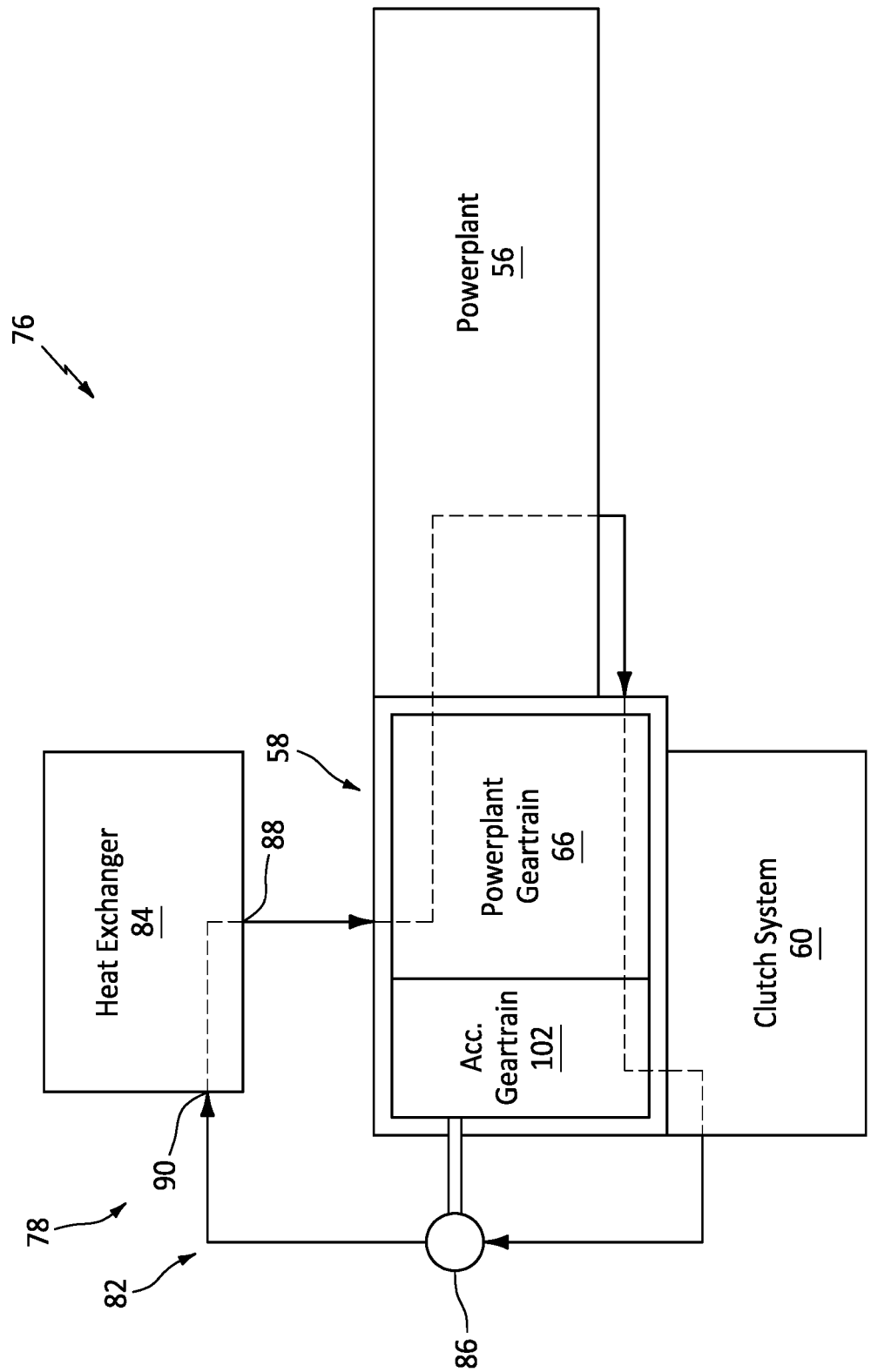
FIG. 3 is a partial schematic illustration of the aircraft system with another lubrication system arrangement.

In some embodiments, referring to FIG. 3, the power transmission 58 may also include an accessory geartrain 102 (e.g., an accessory gearbox) driven by the aircraft powerplant 56, for example through a power takeoff from the power geartrain 66 or a power takeoff from another spool of the aircraft powerplant 56 (e.g., where the powerplant 56 is a gas turbine engine). Alternatively, the accessory geartrain 102 may be integrated with or included as a part of the power geartrain 66; e.g., a gear of the accessory geartrain 102 may be meshed with a gear of the power geartrain 66, etc. The accessory geartrain 102 is configured to distribute mechanical power to the lubricant pump 86 and/or one or more other accessories for the aircraft system 76. The accessory geartrain 102 may also be serviced (e.g., lubricated, cooled, etc.) by the power system lubrication system 78. The power system lubricant circuit 82, for example, may also extend through the accessory geartrain 102, for example between the aircraft powerplant 56 and the clutch system 60.

While the aircraft powertrain 10 is described above with a single first rotor system 12 and a single second rotor system 14, the present disclosure is not limited to such an exemplary arrangement. The aircraft powertrain 10, for example, may alternatively include multiple of the first rotor systems 12. With such an arrangement, the second rotor system 14 may be omitted as torque from the one of the first rotor systems 12 may counteract torque from another one of the first rotor systems 12. Moreover, while the aircraft is generally described above as a rotorcraft, it is contemplated the lubrication systems 78 and 80 may also be utilized for other types of aircraft.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A system for an aircraft, comprising:
a powertrain including a powerplant, a bladed rotor and a clutch system, the clutch system operatively coupling the powerplant to the bladed rotor, the powerplant configured to drive rotation of the bladed rotor through the clutch system when the clutch system is engaged;
a geartrain operatively coupling the clutch system to the bladed rotor; and
a first lubrication system fluidly coupled with and configured to deliver a first lubricant to the powerplant and the clutch system, the first lubrication system fluidly independent of the geartrain, wherein the first lubricant is directed through the clutch system.

2. The system of claim 1, wherein
the powerplant further includes a power transmission operatively coupling the powerplant to the clutch system; and
the first lubrication system is fluidly coupled to the power transmission and further configured to deliver the first lubricant to the power transmission.

3. The system of claim 2, wherein
the power transmission comprises a power geartrain operatively coupling the powerplant to the clutch system; and
the first lubrication system is fluidly coupled to the power geartrain and further configured to deliver the first lubricant to the power geartrain.

4. The system of claim 2, wherein
the power transmission comprises an accessory geartrain; and
the first lubrication system is fluidly coupled to the accessory geartrain and further configured to deliver the first lubricant to the accessory geartrain.

5. The system of claim 2, wherein the first lubrication system includes a heat exchanger including an inlet and an outlet; and
a lubricant circuit extending longitudinally through the power transmission, the powerplant and the clutch system from the outlet to the inlet.

6. The system of claim 2, wherein the first lubrication system includes a lubricant circuit extending in a downstream direction from the power transmission to the powerplant.

7. The system of claim 2, wherein the first lubrication system includes a lubricant circuit extending in a downstream direction from the powerplant to the power transmission.

8. The system of claim 2, wherein the first lubrication system includes a lubricant circuit extending in a downstream direction from the power transmission to the clutch system.

9. The system of claim 1, wherein the first lubrication system includes a lubricant circuit extending in a downstream direction from the powerplant to the clutch system.

10. The system of claim 1, wherein the powerplant comprises an internal combustion engine.

11. The system of claim 1, wherein the powerplant comprises an electric motor.

12. The system of claim 1, further comprising a second lubrication system fluidly independent of the first lubrication system, the second lubrication system fluidly coupled with and configured to deliver a second lubricant to the geartrain.

13. The system of claim 1, wherein
the bladed rotor comprises a rotorcraft rotor; and
the aircraft comprises a rotorcraft.

14. The system of claim 13, wherein the rotorcraft rotor is a main rotorcraft rotor.

15. A system for an aircraft, comprising:
a powertrain including a powerplant, a bladed rotor and a clutch system, the clutch system operatively coupling the powerplant to the bladed rotor, the powerplant configured to drive rotation of the bladed rotor through the clutch system when the clutch system is engaged;
a gear system geartrain operatively coupling the clutch system to the bladed rotor; and
a lubrication system including a heat exchanger and a lubricant circuit, the heat exchanger including an inlet and an outlet, the lubricant circuit extending longitudinally from the outlet, through the powerplant and the clutch system, and to the inlet, and the lubrication system fluidly independent of the gear system geartrain.

16. The system of claim 15, wherein
the powertrain further includes a power transmission operatively coupling the powerplant to the clutch system; and
the lubricant circuit further extends through the power transmission.

17. The system of claim 16, wherein the lubricant circuit extends sequentially from the power transmission, through the powerplant, to the clutch system.

18. The system of claim 15, wherein the lubricant circuit extends in a downstream direction from the outlet, through the powerplant and the clutch system, and to the inlet.

* * * * *